June 26, 1951 H. A. CHINN ET AL 2,558,337
NOISE GENERATOR
Filed Dec. 10, 1945
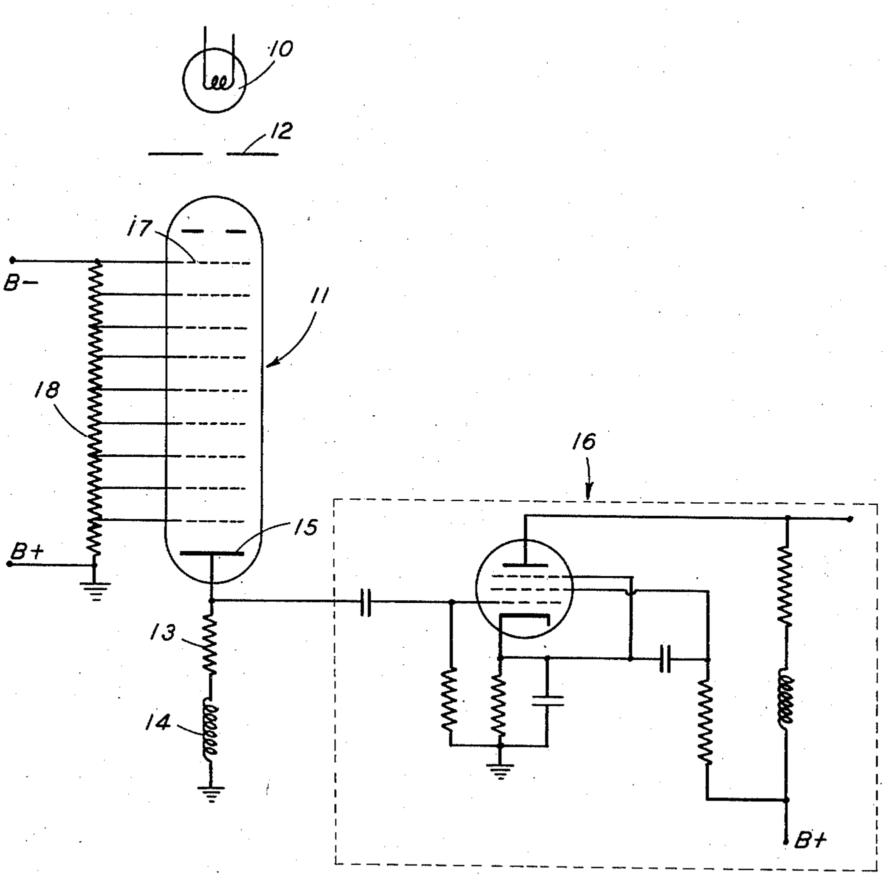
INVENTORS.
JOHN N. DYER
HOWARD A. CHINN
By William D. Hall.
ATTORNEY Patented June 26, 1951

2,558,337

UNITED STATES PATENT OFFICE 2,558,337

NOISE GENERATOR

Howard A. Chinn, New York, N. Y., and John N. Dyer, Cambridge, Mass., assignors to the United States of America as represented by the Secretary of War Application December 10, 1945, Serial No. 634,084

5 Claims. (Cl. 250—27)

This invention relates generally to electric apparatus and more particularly to noise generators.

Often it is desired to use a relatively high level, wide-band, random noise generating source. A series of conventional pentode tubes will provide a relatively high level, random noise signal, however, the frequency distribution of the noise current resulting therefrom will not be constant over a wide band of frequencies due to the presence of tube capacity, wiring capacity, and the nonlinear frequency response characteristics of the several interstage coupling networks required between such a series of tubes.

It is an object of the present invention to provide a relatively high level, wide-band, random noise generating source. The device herein disclosed, to accomplish this result, includes a light source and a multistage, electron multiplier phototube, within which noise is generated and amplified.

Other objects, features, and advantages of this invention will suggest themselves to those skilled in the art and will become apparent from the following description of the invention taken in connection with the accompanying drawing which is a schematic diagram of a device employing the principles of the present invention.

Referring now to the drawing, a light source 10, and a multistage photo electron multiplier tube 11, have interposed between them an adjustable aperture 12. A series circuit including a resistor 13 and an inductance 14 is connected between collector anode 15 of tube 11 and ground. A connection between collector plate 15 and resistor 13 provides an output circuit for tube 11 which is shown feeding a conventional wideband amplifier stage 16.

Tube 11 includes a collector anode 15 and nine multiplier electrodes one of which is shown designated as 17. A multi-tapped potentiometer 18 supplied with a suitable direct-current potential across its terminals, provides the desired direct-current potential for each of the nine multiplier electrodes.

In operation, light energy from light source 10 strikes electrode 17, the first of a series of nine multiplier electrodes, and in that stage there are generated noise currents and voltages which are further amplified by succeeding stages in tube 11. The resulting amplified noise currents appear at collector anode 15 and provide an output voltage across the load circuit comprising resistor 13 and inductance 14.

If further amplification is desirable, the noise output signal appearing at collector anode 15 may be applied to a vacuum tube amplifier such as tube 16. It is obvious that amplifier stage 16 should be designed to provide constant amplification over the desired frequency range.

Energy required for the operation of the electron multiplier phototube 11 may be supplied by a direct-current potential source connected across potentiometer 18. It should be noted that the first multiplier electrode 17, of tube 11, is at the most negative value and that the succeeding multiplier electrodes are at successively more positive values, and that collector anode 15 is the most positive electrode, being connected to B+ through its load circuit.

Electron multiplier phototubes are commercially available in very small physical sizes which may be operated at voltage gains approaching a million, and these gains are nearly independent of band width, a characteristic obtainable without the difficulties which would be encountered if the prior art methods of wide band amplification were used.

For constant band width and constant output current the noise from a multiplier tube will be proportional to the square root of the amplification factor of that tube. An analysis of the operation of this noise generator indicates that high amplification is important only in that it permits the initial signal current to be of very low magnitude, where the ratio of random current variations to the total current is greater than at the higher currents.

In order to obtain maximum efficiency, the multiplier tube must be operated at minimum light input and maximum gain, therefore the light source 10 used with the photomultiplier tube 11 may be a small pilot lamp with an adjustable aperture 12 in the light beam which is used to control the noise output of tube 11. The light source should not be operated on low frequency alternating current unless precautions are taken to filter out the disturbing hum which will appear in the multiplier output.

Another operating condition which must be fulfilled in order to obtain maximum noise output from the phototube is the use of maximum rated voltage.

There has been found that a circuit similar to that shown in the drawing, provides an output noise signal whose energy distribution with respect to frequency is essentially flat from a few cycles per second to 5 mc.

While there has been here described one embodiment of the present invention, it will be manifest to those skilled in the art that various changes and modifications may be made therein. It is therefore aimed in the appended claims to cover all such changes and modifications as fall within the true spirit and scope of the invention.

What is claimed is:

1. A noise generator comprising a light source, a multistage photo electron multiplier tube, an adjustable aperture interposed between said light source and said tube, said aperture being so adjusted that the output of said light source is barely sufficient to activate said tube, a resistor connected between a source of direct-current potential and ground, said resistor being connected to the multiplier electrodes of said tube so that potentials of increasing positive value are impressed on said electrodes, the maximum value being the maximum rated voltage of said tube, the electrode nearest said light source being at the lowest potential, and a load connected to the collector electrode of said tube.

2. A noise generator comprising a light source, a multistage photo electron multiplier tube, an adjustable aperture interposed between said light source and said tube, said aperture being so adjusted that the output of said light source is barely sufficient to activate said tube, and means for applying positive potentials on the electrodes in said multiplier tube, the highest potential being the maximum rated voltage of said tube, the potentials impressed upon said electrodes being successively higher on said electrodes distant from said light source.

3. A noise generator comprising, a multistage photo electron multiplier tube, means for applying positive potentials on the electrodes in said multiplier tube, the highest potential being the maximum rated voltage of said tube, the potentials impressed upon said electrodes being successively lower on said electrodes distant from the collector anode, and light source means having an output barely sufficient to activate said tube.

4. A noise generator comprising, a multistage electron multiplier tube, means for applying positive potentials to the electrodes of said tube, the potentials being the maximum rated potentials of said tube and being successively lower on the electrodes further from the collector electrode, and energizing means for the cathode of said tube, sufficient to barely activate said cathode.

5. The method of generating high level, random noise over a wide band by means of a multistage photo electron tube, comprising applying maximum rated voltage to the electrodes of said tube, and illuminating the cathode of said tube an amonut barely sufficient to activate the cathode of said tube.

HOWARD A. CHINN.
JOHN N. DYER.

REFERENCES CITED

The following references are of record in the file of this patent:

UNITED STATES PATENTS

| Number | Name | Date |
|---|---|---|
| 1,668,383 | Smith | May 1, 1928 |
| 1,981,537 | Allibone | Nov. 20, 1934 |
| 2,031,864 | Teves et al. | Feb. 25, 1936 |
| 2,077,840 | Koros | Apr. 20, 1937 |
| 2,135,615 | Farnsworth | Nov. 8, 1938 |
| 2,145,727 | Lloyd, Jr. | Jan. 31, 1939 |
| 2,212,645 | Morton | Aug. 27, 1940 |
| 2,251,923 | Druyvesteyn | Aug. 12, 1941 |
| 2,253,975 | Guanella | Aug. 26, 1941 |
| 2,336,774 | Brackney et al. | Dec. 14, 1943 |
| 2,342,986 | Van Den Bosch | Feb. 29, 1944 |
| 2,342,987 | Van Den Bosch | Feb. 29, 1944 |
| 2,375,830 | Spencer | May 15, 1945 |
| 2,416,307 | Grieg | Feb. 25, 1947 |
| 2,465,342 | Arditi | Mar. 29, 1949 |

FOREIGN PATENTS

| Number | Country | Date |
|---|---|---|
| 832,456 | France | May 5, 1937 |
| 841,700 | France | Aug. 4, 1938 |
| 514,297 | Great Britain | Nov. 6, 1939 |

OTHER REFERENCES

Technical Manual TM 11-845 on the Transmitting Set AN/TPT-1, November 14, 1944, pages 25-28.

Procedures in Experimental Physics, Strong, 1930, Prentice-Hall, New York, pages 434-436.

Shockley and Pierce: "A Theory of Noise for Electron Multipliers," Proceedings of I. R. E., vol. 26, No. 3, March 1938, pages 321-332.

Thompson: "Voltage-Controlled Electron Multipliers," Proceedings of I. R. E., November 1941, pages 583-587.